(12) United States Patent
Kakinuma

(10) Patent No.: US 9,891,752 B2
(45) Date of Patent: Feb. 13, 2018

(54) TOUCH OPERATION DETECTION APPARATUS

(71) Applicant: TOYOTA JIDOSHA KABUSHIKI KAISHA, Toyota-shi, Aichi-ken (JP)

(72) Inventor: Shoji Kakinuma, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/920,417

(22) Filed: Oct. 22, 2015

(65) Prior Publication Data

US 2016/0170561 A1    Jun. 16, 2016

(30) Foreign Application Priority Data

Dec. 11, 2014  (JP) ................................ 2014-251221

(51) Int. Cl.
*G06F 3/041* (2006.01)
*G06F 3/044* (2006.01)
*G06F 3/0488* (2013.01)

(52) U.S. Cl.
CPC ............ *G06F 3/0418* (2013.01); *G06F 3/044* (2013.01); *G06F 3/0488* (2013.01); *G06F 2203/04104* (2013.01); *G06F 2203/04808* (2013.01)

(58) Field of Classification Search
CPC . G06F 2203/04104; G06F 2203/04808; G06F 3/0418; G06F 3/044; G06F 3/0488
USPC ........................................................ 345/173
See application file for complete search history.

(56) References Cited

U.S. PATENT DOCUMENTS

| 5,283,559 | A | 2/1994 | Kalendra et al. |
| 9,152,216 | B1 * | 10/2015 | Xu .................. G06F 1/3262 |
| 2007/0262965 | A1 | 11/2007 | Hirai et al. |
| 2010/0139990 | A1 | 6/2010 | Westerman et al. |
| 2011/0291944 | A1 | 12/2011 | Simmons et al. |
| 2012/0019468 | A1 | 1/2012 | Westerman et al. |

(Continued)

FOREIGN PATENT DOCUMENTS

| JP | 4351599 B2 | 10/2009 |
| JP | 2010-049642 A | 3/2010 |

(Continued)

OTHER PUBLICATIONS

Apr. 5, 2017 Office Action issued in U.S. Appl. No. 15/455,828.
Aug. 1, 2017 Notice of Allowance issued in U.S. Appl. No. 15/455,828.

*Primary Examiner* — Dmitriy Bolotin
(74) *Attorney, Agent, or Firm* — Oliff PLC

(57) ABSTRACT

A touch operation detection apparatus includes a touch pad that has an operation surface touchable by an operator's body, and has a plurality of electrostatic sensors incorporated therein each of which detects electrostatic capacitance that is variable according to a touch on the operation surface; a number-of-touched-point determination part that determines whether the number of touched points at which touches are made on the operation surface of the touch pad is greater than or equal to 2 based on signals from the electrostatic sensors; and a sensitivity adjustment execution part that executes a sensitivity adjustment concerning the touch against the operation surface of the touch pad when the number-of-touched-point determination part determines that the number of touched points is greater than or equal to 2.

16 Claims, 4 Drawing Sheets

(56) References Cited

U.S. PATENT DOCUMENTS

| | | |
|---|---|---|
| 2012/0127115 A1 | 5/2012 | Gannon |
| 2012/0242617 A1 | 9/2012 | Lee |
| 2013/0063380 A1* | 3/2013 | Wang .................. G06F 3/04883 345/173 |
| 2013/0113753 A1* | 5/2013 | Lee ....................... G06F 3/0418 345/174 |
| 2013/0229376 A1 | 9/2013 | Westerman et al. |
| 2013/0257793 A1 | 10/2013 | Zeliff et al. |
| 2014/0002395 A1* | 1/2014 | Ito ............................. G06F 3/01 345/173 |
| 2014/0062893 A1 | 3/2014 | Kawalkar |
| 2014/0077929 A1* | 3/2014 | Dumas ............... G07C 9/00571 340/5.61 |
| 2014/0078115 A1 | 3/2014 | Itsuki |
| 2014/0267132 A1* | 9/2014 | Rabii ................... G06F 3/0418 345/174 |
| 2014/0292481 A1* | 10/2014 | Dumas ................ G07C 9/00111 340/5.61 |
| 2015/0153865 A1 | 6/2015 | Westerman et al. |
| 2016/0162100 A1* | 6/2016 | Hong ................... G06F 3/0416 345/174 |

FOREIGN PATENT DOCUMENTS

| | | |
|---|---|---|
| JP | 2011-113188 A | 6/2011 |
| JP | 2013-157028 A | 8/2013 |
| JP | 2014-100998 A | 6/2014 |
| WO | 2012/157291 A1 | 11/2012 |
| WO | 2013/190857 A1 | 12/2013 |

\* cited by examiner

TOUCH OPERATION DETECTION APPARATUS

BACKGROUND OF THE INVENTION

1. Field of the Invention

The present invention relates to a touch operation detection apparatus.

2. Description of the Related Art

In the related art, a touch operation detection apparatus which detects a touch operation of a human being is known (for example, see Japanese Laid-Open Patent Application No. 2011-113188). The known touch operation detection apparatus includes a touch panel of an electrostatic capacitance type touchable by a body of a human being. The touch panel includes a plurality of electrostatic sensors each of which has an electrostatic capacitance varying according to a touch thereto. Each electrostatic sensor outputs a signal according to its electrostatic capacitance. A control part of the touch operation detection apparatus detects the electrostatic capacitance value based on the signal from the electrostatic sensor, and determines whether the touch operation is being made based on the detected electrostatic capacitance value.

The known touch operation detection apparatus activates a calibration circuit and carries out an offset adjustment of replacing the output value of the electrostatic sensor by zero, determining that a touch does not intend a data input as an operation of an operator, when a touch detection time of detecting the touch on an operation surface of the touch panel has become greater than or equal to a predetermined time. Thus, it is possible to avoid an erroneous determination that a touch operation is being made, due to a fact that the operator is unintentionally touching the operation surface by his or her finger, merely a stain or so adheres to the operation surface, or so.

SUMMARY OF THE INVENTION

According to one aspect of the present invention, a touch operation detection apparatus includes a touch pad that has an operation surface touchable by an operator's body, and has a plurality of electrostatic sensors incorporated therein each of which detects electrostatic capacitance that is variable according to a touch on the operation surface; a number-of-touched-point determination part that determines whether the number of touched points at which touches are made on the operation surface of the touch pad is greater than or equal to 2 based on signals from the electrostatic sensors; and a sensitivity adjustment execution part that executes a sensitivity adjustment concerning the touch against the operation surface of the touch pad when the number-of-touched-point determination part determines that the number of touched points is greater than or equal to 2.

Other objects, features and advantages of the present invention will become more apparent from the following detailed description when read in conjunction with the accompanying drawings.

DETAILED DESCRIPTION OF THE EMBODIMENTS

The above-described apparatus according to Japanese Laid-Open Patent Application No. 2011-113188 does not assume such circumstances that there are a plurality of persons who make touch operations on a touch panel. The electrostatic capacitances of the bodies of respective individuals differ thereamong. Therefore, when a plurality of persons make touch operations on the touch panel, the electrostatic capacitance value of the electrostatic sensor may indicate a value on a side affirming a touch operation with respect to a threshold for a person whereas it may indicate a value on a side negating a touch operation with respect to the threshold for another person even when the same touch operations are made thereby against the operation surface. Accordingly, it is an appropriate way to carry out a sensitivity adjustment for each person who makes a touch operation against the touch panel in order to properly determining whether a touch operation is made based on the electrostatic capacitance value detected by the electrostatic sensor.

For the purpose of thus carrying out a sensitivity adjustment, each person needs to touch the operation surface. If such a sensitivity adjustment is carried out always regardless of each particular specific state of the person who touches the operation surface, the following problem may occur. That is, if a human being touches the operation surface by his or her single finger, the touch state may be unstable in comparison to a case where he or she touches the operation surface by his or her palm or fingers. Therefore, if a sensitivity adjustment is carried out based on the electrostatic capacitance value acquired in such a single finger touching state, it may be difficult to implement a very precise sensitivity adjustment, and thus, the accuracy of determining whether a touch operation is made may be degraded.

The present embodiment has been devised in consideration of such circumstances, and an object is to provide a touch operation detection apparatus with which it is possible to improve the preciseness of a sensitivity adjustment concerning a touch against an operation surface.

The present embodiment relates to a touch operation detection apparatus, using electrostatic-capacitance-type electrostatic sensors, suitable for detecting a touch operation against the operation surface of a touch pad.

Below, using the accompanying drawings, a touch operation determination apparatus according to the embodiment will be described.

Figure 1:
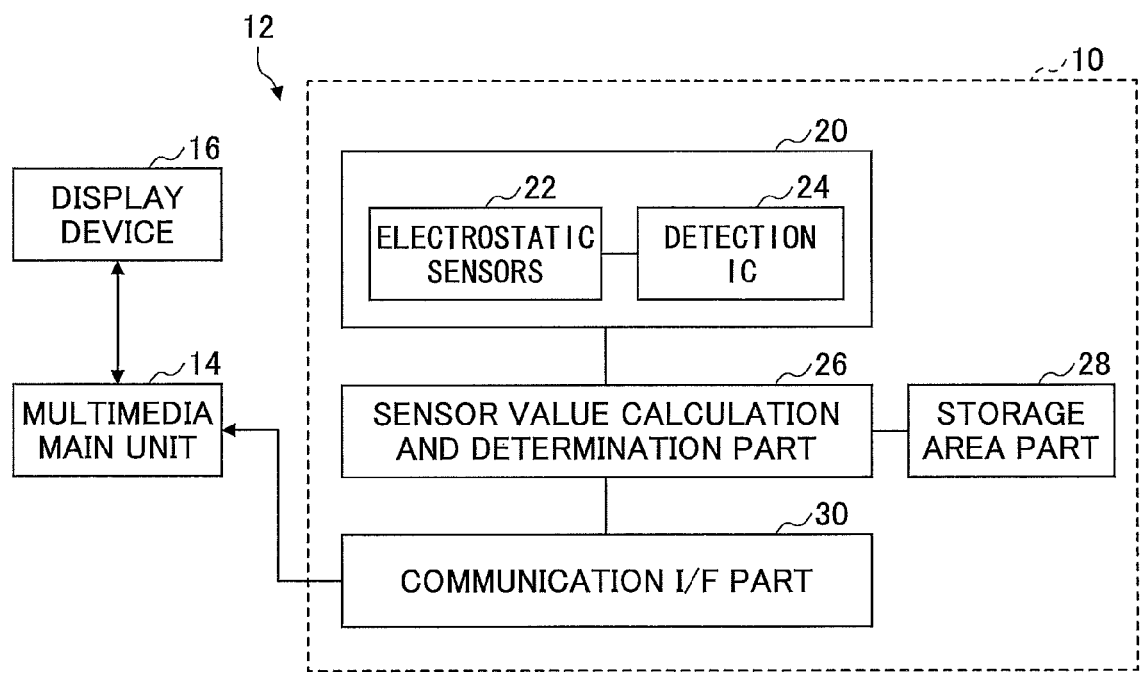
FIG. 1 illustrates a configuration of a system including a touch operation detection apparatus according to a present embodiment of the present invention.
Figure 2:
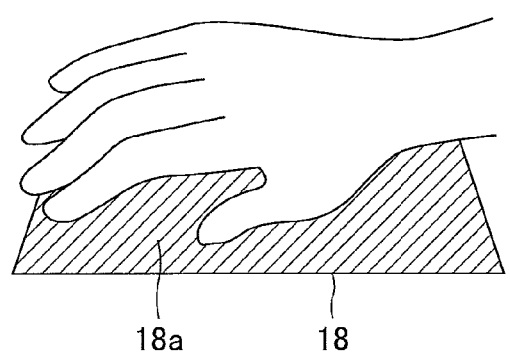
FIG. 2 is an outline view of a touch pad of the touch operation detection apparatus according to the present embodiment.
Figure 3:
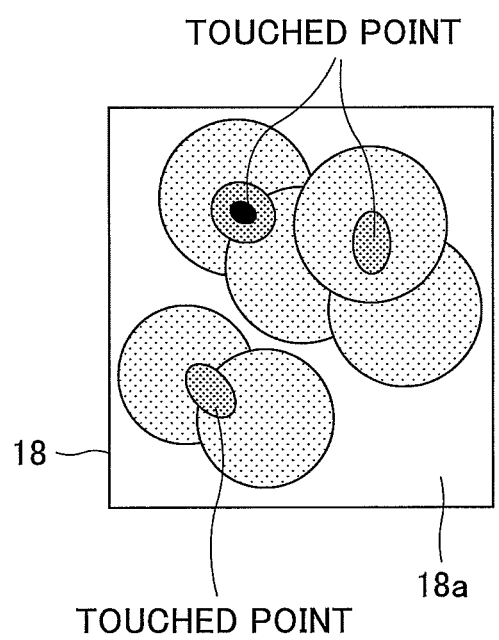
FIG. 3 illustrates one example of a distribution of the electrostatic capacitance values of signals that are output by electrostatic sensors according to the present embodiment when a human being touches an operation surface of the touch pad of the electrostatic sensor.

FIG. 1 illustrates a configuration of a system 12 including a touch operation detection apparatus 10 according to the present embodiment. FIG. 2 is an outline view of a touch pad of the touch operation detection apparatus 10 according to the present embodiment. FIG. 3 illustrates one example of a distribution of the electrostatic capacitance values of signals that are output by electrostatic sensors according to the present embodiment when a human being touches an operation surface of the touch pad.

The touch operation detection apparatus 10 according to the present embodiment is included in the system 12 installed in a vehicle, for example. The system 12 includes the touch operation detection apparatus 10, and also includes a multimedia main unit 14 and a display device 16. The touch operation detection apparatus 10 and the multimedia main unit 14 are mutually connected. Also the multimedia main unit 14 and the display device 16 are mutually connected.

The touch operation detection apparatus 10 is placed at a position inside the vehicle where a vehicle occupant (in particular, a driver) can operate it by his or her body (in more detail, a hand, a palm, a finger or so) by directly touching it. The touch operation detection apparatus 10 includes a touch pad 18 where the body of a human being (an operator) can touch an operation surface 18a. The touch operation detection apparatus 10 detects a touch operation on the operation surface 18a of the touch pad 18 by detecting the track where a finger touches the operation surface 18a and moves as a coordinate movement.

After detecting such a coordinate movement or a touch operation on the operation surface 18a of the touch pad 18, the touch operation detection apparatus 10 transmits information indicating the coordinate movement to the multimedia main unit 14. Also, after determining that a functional button (software switch) on the display device 16 has been operated due to a touch operation on the operation surface 18a of the touch pad 18, the touch operation detection apparatus 10 transmits corresponding command information indicating the operation to the multimedia main unit 14.

The multimedia main unit 14 controls entertainment functions used in the vehicle such as navigation, audio (information reproduction from a recording medium such as a DVD, a CD, a HDD, a USB memory, or so), a radio, and/or the like. The multimedia main unit 14 can receive the coordinate movement information from the touch operation detection apparatus 10, and move a cursor on a screen page displayed by the display device 16 based on the coordinate movement information.

The multimedia main unit 14 can detect that a hardware switch is operated, and also, can detect that a software switch displayed on the screen page displayed by the display device 16 is operated based on the command information received from the touch operation detection apparatus 10. The multimedia main unit 14 controls the screen page displayed by the display device 16 and the entertainment functions based on a detection result of the hardware switch being operated and/or a detection result of the software switch being operated.

The display device 16 is placed at such a position in the vehicle that the vehicle occupant can see it. The display device 16 carries out drawing on the screen page based on drawing information from the multimedia main unit 14. The display device 16 can display the cursor, the software switch, and so forth, on the screen page.

Next, a detailed configuration of the touch operation detection apparatus 10 will be described.

According to the present embodiment, the touch operation detection apparatus 10 includes an electrostatic sensor detection part 20. The electrostatic sensor detection part 20 includes a plurality of electrostatic sensors 22. The electrostatic sensors 22 are installed in the touch pad 18 spreading planarly. The electrostatic sensors 22 are arranged on the operation surface 18a of the touch pad 18, and are placed at predetermined cells (coordinates) on the operation surface 18a, respectively. When a body part such as a palm or a finger of a human being touches the operation surface 18a of the touch pad 18, the electrostatic capacitance between the corresponding electrostatic sensor 22 and the body part varies. Each electrostatic sensor 22 outputs a signal according to the electrostatic capacitance value appearing on the operation surface 18a.

The electrostatic sensor detection part 20 also includes a detection Integrated Circuit (IC) 24. The detection IC 24 is connected to the electrostatic sensors 22. The output signals of the respective electrostatic sensors 22 are supplied to the detection IC 24. The detection IC 24 outputs signals according to the magnitudes of the electrostatic capacitance values based on the signals supplied by the respective electrostatic sensors 22 at the corresponding cells on the operation surface 18a.

The touch operation detection apparatus 10 also includes a sensor value calculation and determination part 26. The sensor value calculation and determination part 26 is connected to the electrostatic sensor detection part 20. The output signals of the electrostatic sensor detection part 20 are supplied to the sensor value calculation and determination part 26. The sensor value calculation and determination part 26 detects the electrostatic capacitance values of the respective cells of the operation surface 18a based on the output signals supplied by the electrostatic sensor detection part 20. Then, by comparing the detected electrostatic capacitance values with a determination threshold, the sensor Value calculation and determination part 26 determines whether a human being is touching the operation surface 18a of the touch pad 18 (a touch ON/OFF determination).

After determining that the operation surface 18a is being touched (a "touch ON" determination) in the touch ON/OFF determination, the sensor value calculation and determination part 26 determines whether the coordinate position on the operation surface 18a corresponding to "touch ON" (the touched position) moves over time. If the sensor value calculation and determination part 26 makes an affirmative determination as a result, it outputs information indicating the coordinate movement of the touched position (for example, the movement direction, the movement amount, the movement speed, and/or the like). The sensor value calculation and determination part 26 optimizes the determination threshold to be used for the touch ON/OFF determination at a predetermined timing (for example, each time when the power is turned on in the vehicle), as will be described later.

The touch operation detection apparatus 10 also includes a storage area part 28 connected to the sensor value calculation and determination part 26. The storage area part 28 is a volatile memory such as a RAM storing information indicating the determination threshold to be used for the touch ON/OFF determination. The sensor value calculation and determination part 26 transmits information indicating the optimized determination threshold to the storage area part 28. The storage area part 28 stores the information indicating the determination threshold from the sensor value calculation and determination part 26. The sensor value calculation and determination part 26 reads the determination threshold from the storage area part 28, if necessary, and uses the determination threshold for the touch ON/OFF determination.

The touch operation detection apparatus 10 also includes a communication interface (IF) part 30. The communication I/F part 30 is connected to the sensor value calculation and determination part 26, and also, is connected to the multimedia main unit 14. The communication I/F part 30 transmits information indicating the coordinate movement of the touched position supplied by the sensor value calculation and determination part 26 to the multimedia main unit 14.

Figure 4:
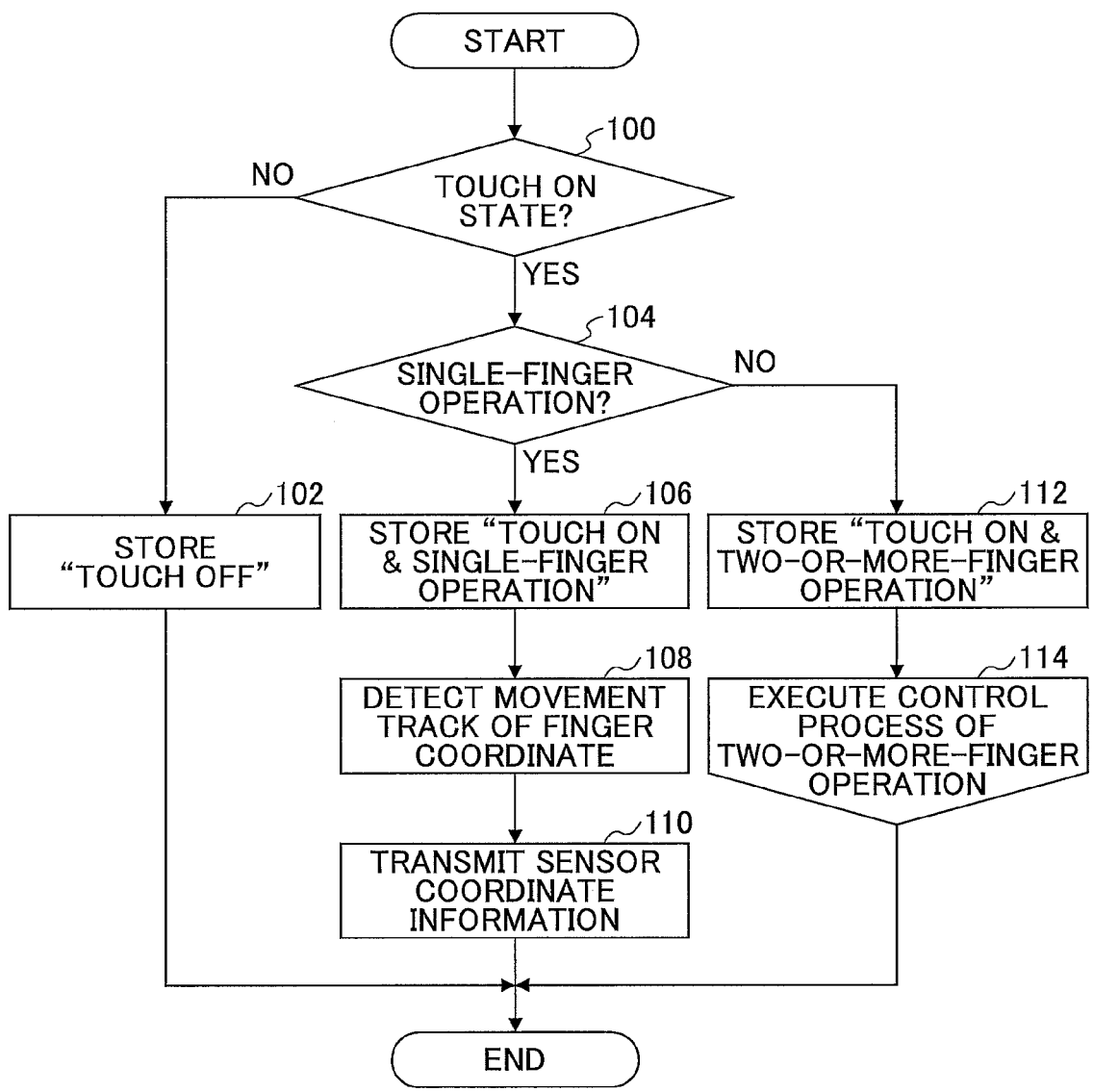
FIG. 4 is a flowchart of one example of a main routine executed by the touch operation detection apparatus according to the present embodiment.

Next, using FIG. 4, operations that the touch operation detection apparatus 10 according to the present embodiment usually carries out will be described. FIG. 4 is a flowchart of one example of a main routine executed by the touch operation detection apparatus 10 according to the present embodiment.

According to the present embodiment, the sensor value calculation and determination part 26 of the touch operation detection apparatus 10 carries out the touch ON/OFF determination of determining whether the body of a human being is touching the operation surface 18*a* of the touch pad 18 based on the information from the electrostatic sensor detection part 20, after the system 12 is started (step 100). In more detail, in the touch ON/OFF determination, the sensor value calculation and determination part 26 monitors the electrostatic capacitance value of each cell of the operation surface 18*a*, compares the electrostatic capacitance value from the electrostatic sensor detection part 20 with the determination threshold from the storage area part 28, and determines whether the electrostatic capacitance value exceeds the determination threshold.

Then, after determining that no touch of a human being is being made on the operation surface 18*a* (a "touch OFF" determination) because the electrostatic capacitance value is less than the determination threshold, the sensor value calculation and determination part 26 stores information indicating that the current state is a "touch OFF" state in a memory (step 102). Note that the thus stored "touch OFF" state is used for a comparison with a state in the subsequent execution of the control routine.

On the other hand, after determining that a touch of a human being is being made on the operation surface 18*a* (a "touch ON" determination) because the electrostatic capacitance value exceeds the determination threshold, the sensor value calculation and determination part 26 determines whether the "touch ON" is being made by a single finger, i.e., whether the number of touched points at which the touch is made on the operation surface 18*a* (the number of touched points at each of which the electrostatic capacitance value exceeds the determination threshold) is 1 or more (step 104). Note that this determination can be made in such a manner that an affirmative determination is made when the only one peak electrostatic capacitance value is included in the distribution of the electrostatic capacitance values on of the operation surface 18*a*. When a human being touches the touch pad 18 by his or her palm, a plurality of the peak electrostatic capacitance values are included in the above-mentioned distribution, and thus, the number of touched points at which touches are made on the operation surface 18*a* is greater than or equal to 2.

When determining that the number of touched points is 1 in step 104, the sensor value calculation and determination part 26 stores information indicating that the current state is a "touch ON" state and also is a "single-finger operation" state in the memory (step 106). Note that the thus stored state is used for a comparison with the state in the subsequent execution of the control routine. Then, the sensor value calculation and determination part 26 detects the movement track of the "single-finger operation" touched position in the coordinate (step 108), and sends such an instruction to the communication I/F part 30 as to cause it to send sensor coordinate information indicating the detected movement track to the multimedia main unit 14 (step 110).

On the other hand, when determining that the number of touched points is not 1 as a result of step 104, the sensor value calculation and determination part 26 can determine that, as shown in FIG. 3, a multipoint detection is made where the number of touched points is greater than or equal to 2. Thus, the sensor value calculation and determination part 26 stores information indicating that the current state is a "touch ON" state and also is a "two-or-more-finger operation" state in the memory (step 112). Note that the thus stored state is used for a comparison with the state in the subsequent execution of the control routine. Then, the sensor value calculation and determination part 26 executes a predetermined control process (a scrolling function, an image zooming in/out function, or so) based on the predetermined "two-or-more-finger" touch operation, and sends such an instruction to the communication I/F part 30 as to cause it to send the process result to the multimedia main unit 14 (step 114).

Thus, it is possible to carry out not only the touch ON/OFF determination of determining whether a touch of a human being is being made on the operation surface 18*a* of the touch pad 18 but also a determination which is further made after a "touch ON" determination is made as to whether the "touch ON" is based on a "single-finger operation" or a "two-or-more-finger operation". Also, when the "touch ON" determination is made and also the touch operation is made on the operation surface 18*a* along with its position movement, it is possible to send information based on the "touch ON" finger operation (in more detail, information indicating the movement of the finger on the operation surface 18*a* of the touch pad 18, or the command information based on the finger operation on the operation surface 18*a*) to the multimedia main unit 14.

Figure 5:
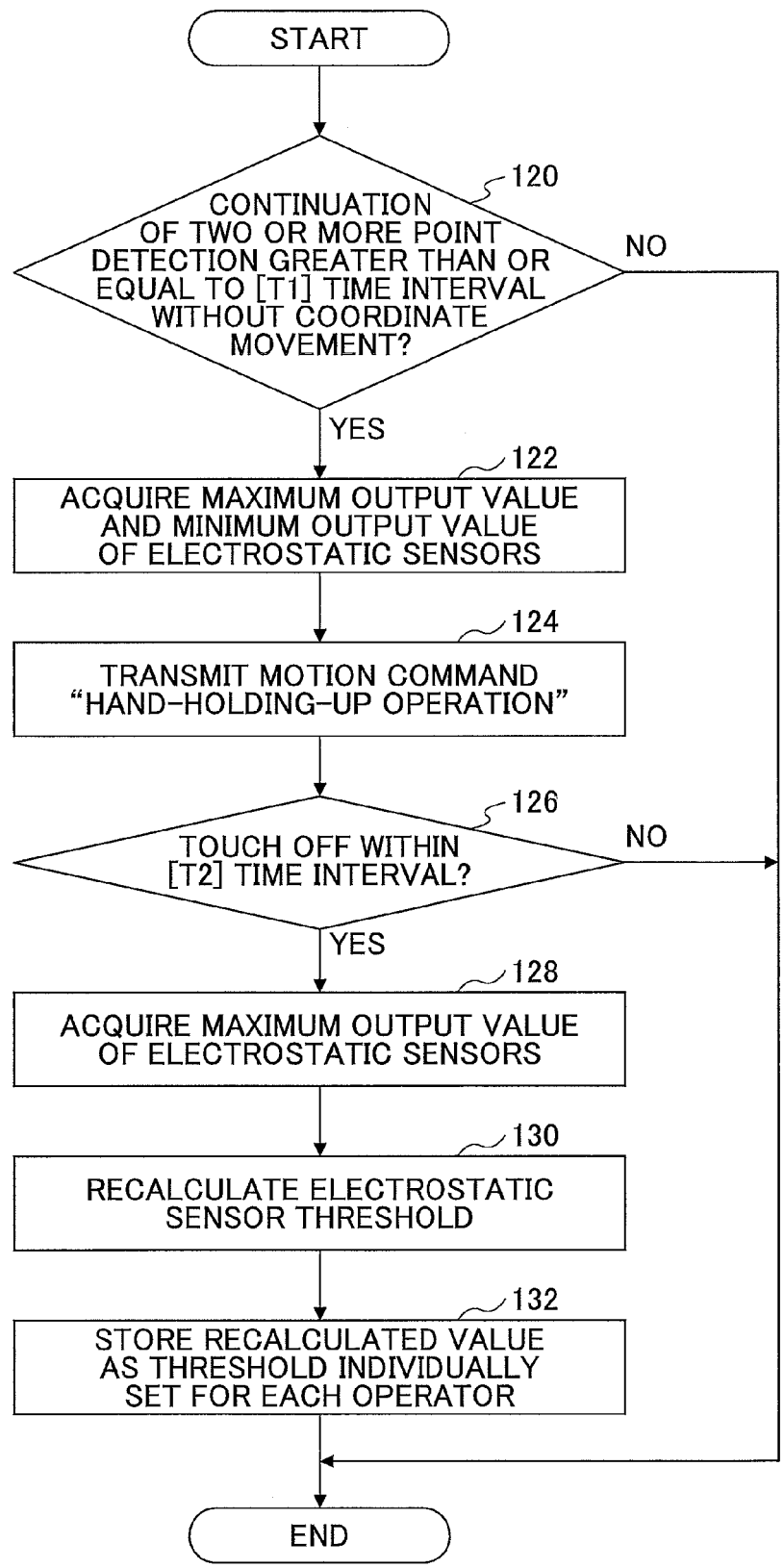
FIG. 5 is a flowchart of one example of a control routine executed by the touch operation detection apparatus for carrying out a sensitivity adjustment according to the present embodiment.

Next, using FIG. 5, a sensitivity adjustment on the touch pad 18 executed by the touch operation detection apparatus 10 according to the present embodiment will be described. FIG. 5 is a flowchart of one example of a control routine executed by the touch operation detection apparatus for carrying out a sensitivity adjustment concerning a touch against the operation surface 18*a* of the touch pad 18 of the touch operation detection apparatus 10 according to the present embodiment.

According to the present embodiment, the sensor value calculation and determination part 26 of the touch operation detection apparatus 10 determines, in a predetermined timing after the start of the system 12, whether a first condition and a second condition are satisfied (step 120). The first condition is a condition that a "touch ON" determination of determining that a human body is touching the operation surface 18*a* is made, and a state where a "two-or-more-finger operation" where the number of touched points of the "touch ON" is greater than or equal to 2 continues for a time greater than or equal to a predetermined time T1. The second condition is a condition that, during a time equal to the predetermined time T1 included in the above-mentioned time greater than or equal to the predetermined time T1, the "touch ON" touched positions do not change on the operation surface 18*a*. Note that the predetermined time T1 is set for carrying out a sensitivity adjustment of the touch pad 18 and is the shortest time during which the above-mentioned state is to continue, and, for example, is set to 2 seconds.

Therefore, the sensor value calculation and determination part 26 further proceeds with no process and finishes the current routine, when a negation determination is made in step 120, i.e., (1) no "touch ON" determination is made, (2) it is determined that the number of touched points of "touch ON" is 1, (3) it is determined that the number of touched points of "touch ON" is greater than or equal to 2 but the state does not continue for the predetermined time T1, or (4) it is determined that the "touch ON" touched positions change on the operation surface 18*a* during a time equal to the predetermined time T1 even during which the state continues.

On the other hand, when an affirmative determination is made in step 120, i.e., a "touch ON" determination is made and, a state where the number of touched points of the "touch ON" is greater than or equal to 2 continues for a time greater than or equal to the predetermined time T1 under the condition where the "touch ON" touched positions do not change on the operation surface 18*a*, the sensor value calculation and determination part 26 carries out the following process next. That is, the sensor value calculation and determination part 26 extracts the maximum value and the minimum value of the electrostatic capacitances on the operation surface 18*a* based on the electrostatic capacitance value at each cell from the electrostatic sensor detection part 20 at the present time, and stores them in the memory (step 122).

Also, when the affirmative determination is made in step 120, the sensor value calculation and determination part 26 determines that a "hand-holding-up operation" is made against the touch pad 18, and sends such an instruction to the communication I/F part 30 as to cause it to transmit the "hand-holding-up operation" motion command information to the multimedia main unit 14 (step 124). Thereby, the multimedia main unit 14 executes a command assigned to the "hand-holding-up operation" to the display device 16.

Note that the command assigned to the "hand-holding-up operation" is, for example, to send an instruction to enter a state of allowing an operator's operation after immediately finishing a start-up screen page, to send an instruction to switch the speaker volume to be turned on/off, to send an instruction to invoke a home screen page, to send an instruction to cancel all the inputs, to send an instruction to stop the route guidance of the navigation function, or so.

Next, the sensor value calculation and determination part 26 determines whether a "touch OFF" determination of a human being's body not touching the operation surface 18*a* is made within a predetermined time T2 after the "touch ON" determination of a human being's body touching the operation surface 18*a* is made (step 126). It can be also said that, here, it is determined whether the state where no "touch OFF" determination is made continues for a predetermined time T2 or more after the "touch ON" determination is made. Thus, the predetermined time T2 is set for not carrying out the sensitivity adjustment of the touch pad 18, is the shortest time during which the above-mentioned state is to continue, is longer than the predetermined time T1, and, for example, is set to be 5 seconds.

Therefore, when a negation determination is made in step 126, i.e., the sensor value calculation and determination part 26 determines that no "touch OFF" determination is made within the predetermined time T2, the sensor value calculation and determination part 26 then further proceed with no process and finishes the current routine. This is because, in this case, it can be determined that foreign matter such as a coin is put on the operation surface 18*a* of the touch pad 18 or a stain adheres to the operation surface 18*a* of the touch pad 18 so that the state where no "touch OFF" determination is made continues for the predetermined time T2 or more.

On the other hand, when an affirmative determination is made in step 126, i.e., the sensor value calculation and determination part 26 determines that a "touch OFF" determination has been made within the predetermined time T2, the sensor value calculation and determination part 26 then extracts the maximum value of the electrostatic capacitances on the operation surface 18*a* based on the electrostatic capacitance value at each cell from the electrostatic sensor detection part 20 at the time of the "touch OFF" determination, and stores it in the memory (step 128).

Then, the sensor value calculation and determination part 26 recalculates the determination threshold to be used for the touch ON/OFF determination in such a way as to acquire the optimum one based on the maximum value and the minimum value of the electrostatic capacitances at the time of "touch ON" stored in the memory in step 122 and the maximum value of the electrostatic capacitances at the time of "touch OFF" stored in the memory in step 128 (step 130). Note that the initial value of the determination threshold can be a predetermined fixed value or the one after being previously updated.

The recalculation of the determination threshold in step 130 is carried out using, for example, the maximum value of the electrostatic capacitances at the time of "touch ON", using the difference between the maximum value of the electrostatic capacitances at the time of "touch ON" and the maximum value of the electrostatic capacitances at the time of "touch OFF", using the difference between the minimum value of the electrostatic capacitances at the time of "touch ON" and the maximum value of the electrostatic capacitances at the time of "touch OFF", or so. For example, the greater the maximum value of the electrostatic capacitances at the time of "touch ON" is, the greater the determination threshold is which is set for the zone where the electrostatic capacitance is smaller than this maximum value. Also, for example, the determination threshold is set into a predetermined ratio (for example, 70%) of the maximum value of the electrostatic capacitances at the time of "touch ON". Also, for example, the greater the maximum value of the electrostatic capacitances at the time of "touch OFF" is, the greater the determination threshold is which is set for the zone where the electrostatic capacitance is greater than this maximum value.

The sensor value calculation and determination part 26 transmits information indicating the determination threshold thus optimized through the recalculation as mentioned above to the storage area part 28, and stores the information indicating the determination threshold in the storage area part 28 (step 132). Note that, as will be described later, in step 132, the determination threshold can be stored in the storage area part 28 as a threshold that is individually set for each operator. After the determination threshold is thus stored, thereafter the determination threshold in the storage area part 28 is used in the touch ON/OFF determination, and is continuously used until the determination threshold is updated subsequently.

Thus, according to the touch operation detection apparatus 10 of the present embodiment, the determination threshold to be used for the touch ON/OFF determination can be recalculated and the calculation result can be stored in the storage area part 28, when a "touch ON" determination is made and the number of touched points of the "touch ON" is greater than or equal to 2, or in more detail, when the "touch ON" determination is made and the state where the number of touched points of the "touch ON" is greater than or equal to 2 continues for the predetermined time T1 under the condition where the "touch ON" touched positions do not change on the operation surface 18*a*. Also, it is possible to change the determination threshold into the optimum one based on the values at least including the maximum value of the electrostatic capacitances at the time of "touch ON" (in addition to this maximum value, it is also possible to include the minimum value of the electrostatic capacitances at the time of "touch ON" and/or the maximum value of the electrostatic capacitances at the time of "touch OFF" in the values).

When the number of touched points of "touch ON" is 1, a case where a person is touching the operation surface 18a by his or her single finger can be assumed. In this case, the contact state on the operation surface 18a is relatively unstable. In contrast thereto, when the number of touched points of "touch ON" is greater than or equal to 2, a case where a person is touching the operation surface 18a by his or her two fingers or more or his or her entire palm can be assumed. In this case, the contact state on the operation surface 18a is relatively stable.

The more stable the contact state on the operation surface 18a is, the more stable the electrostatic capacitance value that is output by the electrostatic sensor 22 at each cell is. Therefore, it is possible to recalculate the determination threshold based on the electrostatic capacitance values detected by using the electrostatic sensors 22 with a higher precision. As a result of the determination threshold being thus recalculated with a higher precision, the sensitivity in the touch ON/OFF determination is adjusted. Therefore, according to the touch operation detection apparatus 10 of the present embodiment, it is possible to improve the precision of the sensitivity adjustment concerning a touch against the operation surface 18a by a human being, in comparison to a configuration where the determination threshold is recalculated when the number of touched points of "touch ON" is 1. Therefore, it is possible to carry out the touch ON/OFF determination on the touch pad 18 with a higher precision.

Also, according to the present embodiment, if a state where the number of touched points of "touch ON" is greater than or equal to 2 does not continue for a time greater than or equal to the predetermined time T1, the sensitivity adjustment is not carried out, i.e., the determination threshold to be used for the touch ON/OFF determination is not changed. In contrast thereto, if the state continues for a time greater than or equal to the predetermined time T1, the sensitivity adjustment is carried out, i.e., the determination threshold is changed. When a state where the number of touched points of "touch ON" is greater than or equal to 2 continues only for a short time even if such a state occurs, the contact state on the operation surface 18a is relatively unstable, and the electrostatic capacitance values are relatively unstable. In contrast thereto, when a state where the number of touched points is greater than or equal to 2 continues for a long time, the contact state is relatively stable, and the electrostatic capacitance values are relatively stable.

Further, according to the present embodiment, the sensitivity adjustment, i.e., a change in the determination threshold, is not carried out, if touched positions of "touch ON" change on the operation surface 18a during a time equal to the predetermined time T1 even if the state where the number of touched points is greater than or equal to 2 continues for a time greater than or equal to the predetermined time T1 and including the above-mentioned time equal to the predetermined time T1. In contrast thereto, the sensitivity adjustment, i.e., a change in the determination threshold, is carried out, if a state where the number of touched points is greater than or equal to 2 continues for a time greater than or equal to the predetermined time T1 and the touched positions of "touch ON" do not change on the operation surface 18a during the time equal to the predetermined time T1 included in the above-mentioned time greater than or equal to the predetermined time T1. If the touched positions change on the operation surface 18a, the contact state on the operation surface 18a is relatively unstable, and the electrostatic capacitance values are relatively unstable. In contrast thereto, if the touched positions do not change on the operation surface 18a, the contact state is relatively stable and the electrostatic capacitance values are relatively stable.

Thus, according to the touch operation detection apparatus 10 of the present embodiment, it is possible to carry out the recalculation of the determination threshold based on the electrostatic capacitance values detected using the electrostatic sensors 22 with a further higher precision. Thus, it is possible to further improve the precision in the sensitivity adjustment concerning a person's touch on the operation surface 18a. Therefore, it is possible to carry out the touch ON/OFF determination on the touch pad 18 with high precision.

Also, according to the present embodiment, the sensitivity adjustment, i.e., the optimization of the determination threshold, is carried out using the electrostatic capacitance values at a time of "touch ON" at which a person is touching the operation surface 18a of the touch pad 18. The sensitivity adjustment, i.e., a change in the determination threshold, is carried out each time, at least including each time when the operator of the touch pad 18 is changed, i.e., for example, each time when the power is turned on in the own vehicle. As a result of carrying it out in such timing, the determination threshold which is the optimum one for each operator is set individually for the operator. Therefore, according to the touch operation detection apparatus 10 of the present embodiment, it is possible to carry out the sensitivity adjustment corresponding to each operator of the touch pad 18, and it is possible to carry out the touch ON/OFF determination with high precision for each operator.

Note that, "a number-of-touched-point determination part" is implemented as a result of, for example, the sensor value calculation and determination part 26 executing step 120 in the routine shown in FIG. 5 in the above-mentioned embodiment. "A sensitivity adjustment execution part" is implemented as a result of, for example, the sensor value calculation and determination part 26 executing steps 130 and 132 in the routine shown in FIG. 5 in the above-mentioned embodiment.

In the above-mentioned embodiment, a change in the determination threshold, i.e., the sensitivity adjustment is carried out in a predetermined timing after the system 12 is started. However, it is also possible that a change in the determination threshold is carried out only once when the system 12 is initially started. Also, in this variant, in order to positively implement a change in the determination threshold, it is possible that, at a time when the screen of the display device 16 is turned on at a time of the initial start of the system 12, the display device 16 displays a message such as "please touch the touch pad with your palm if you are ready" to urge the vehicle occupant to contact the touch pad 18.

Also, in the above-mentioned embodiment, the optimized determination threshold resulting from the sensitivity adjustment is stored in the storage area part 28 that is a volatile memory. In this case, the stored information of the storage area part 28 is reset each time when the power is turned off in the vehicle, and thus the determination threshold disappears. However, the present invention is not limited thereto. Instead of the storage area part 28 that is a volatile memory, it is also possible to sore the determination threshold in a nonvolatile memory such as an EEPROM. According to such a variant, it is possible that the touch operation detection apparatus 10 keeps the storage of the determination threshold even when the power is turned off in the vehicle. Therefore, it is not necessary to optimize the determination threshold each time when the power is turned on in the vehicle.

It is also possible that the determination threshold stored in the storage area part is overwritten and updated only if a large divergence appears (for example, if the change amounts to one greater than or equal to ±10%) when the new determination threshold based on the electrostatic capacitance values detected using the electrostatic sensors 22 is compared with the preceding determination threshold stored in the storage area part, regardless of whether the storage area part storing the determination threshold is a volatile memory or a nonvolatile memory.

Also, in the above-mentioned embodiment, the electrostatic capacitances from the electrostatic sensors 22 are compared with the determination threshold, and the touch ON/OFF determination concerning the touch pad 18 is carried out. The determination threshold to be used for the touch ON/OFF determination is recalculated and updated, when a "touch ON" determination is made and the number of touched points of the "touch ON" is greater than or equal to 2, or in more detail, in a timing when the "touch ON" determination has been made, and the state where the number of touched points of "touch ON" is greater than or equal to 2 has been continuing for a time greater than or equal to the predetermined time T1 under the condition where the touched positions of the "touch ON" do not change on the operation surface 18a. The recalculation of the determination threshold is carried out based on the values at least including the maximum value of the electrostatic capacitances at the time of "touch ON" (which can also include, in addition to this maximum value, the minimum value of the electrostatic capacitances at the time of "touch ON" and/or the maximum value of the electrostatic capacitances at a time of "touch OFF").

However, the present invention is not limited thereto. It is also possible that such a requirement is used that, in addition to the maximum value of the electrostatic capacitances exceeding the determination threshold, the minimum value of the electrostatic capacitances at the time of "touch ON" exceeds zero and is less than or equal to the determination threshold, in order to make a "touch ON" determination indicating that a touch is being made on the touch pad 18 by a person from the fact that the electrostatic capacitance exceeds the determination threshold.

According to this variant, it is possible to avoid an erroneous "touch ON" determination indicating that a person is touching the touch pad 18, under the condition where the minimum value of the electrostatic capacitances has a negative value less than zero, due to foreign matter such as a coin being put on the touch pad 18, noise superposition, and/or the like, without a touch on the touch pad 18 by a person. In such a variant, it is also possible to avoid an erroneous "touch ON" determination indicating that a person is touching the touch pad 18, under the condition where the minimum value of the electrostatic capacitances exceeds the determination threshold because the electrostatic capacitances increase throughout the entire area of the touch pad 18 due to noise superposition or so.

It is also possible that such a requirement is used that the difference between the maximum value of the electrostatic capacitances at a time of "touch ON" and the maximum value of the electrostatic capacitances at a time of "touch OFF" as a result of comparison therebetween is greater than or equal to a predetermined value, in order to update the determination threshold. If this difference is small, it can be determined that, due to noise superposition or so, the electrostatic capacitances are less than or equal to the determination threshold but have relatively great values throughout the entire area of the touch pad 18. Therefore, such an erroneous determination is likely to be made that the number of touched points is greater than or equal to 2 due to noise superposition or so, even when a person operates the touch pad 18 by his or her single finger.

In contrast thereto, according to the above-mentioned variant, an update of the determination threshold (the sensitivity adjustment) is not carried out if the difference between the maximum value of the electrostatic capacitances at a time of "touch ON" and the maximum value of the electrostatic capacitances at a time of "touch OFF" is less than the predetermined value. Therefore, it is possible to avoid such a situation that an erroneous determination that the number of touched points is greater than or equal to 2 is easily to be made even when a person is operating the touch pad 18 by his or her single finger.

Further, in the above-mentioned embodiment, the determination threshold is recalculated and the sensitivity adjustment is carried out when a touch ON determination is made and the number of touched points is greater than or equal to 2. However, the present invention is not limited thereto. It is also possible that the determination threshold is recalculated and the sensitivity adjustment is carried out when a touch ON determination is made and the number of touched points is greater than or equal to 3. According to such a variant, the contact state on the operation surface 18a is more stabilized, and thus, it is possible to further improve the preciseness in the sensitivity adjustment.

Thus, according to the embodiments and variants, it is possible to improve the preciseness in the sensitivity adjustment concerning a touch on the operation surface.

Thus, the touch operation detection apparatuses have been described in the embodiments and variants. However, the present invention is not limited to such specific embodiments and variants. Further, various modifications can be made without departing from the claimed invention.

The present application is based on and claims the benefit of priority of Japanese Priority Application No. 2014-251221, filed on Dec. 11, 2014, the entire contents of which are hereby incorporated herein by reference.

What is claimed is:

1. A touch operation detection apparatus comprising:
a touch pad that has an operation surface touchable by an operator's body, and has a plurality of electrostatic sensors incorporated therein each of which detects electrostatic capacitance that is variable according to a touch on the operation surface;
a number-of-touched-point determination part that determines whether the number of touched points at which touches are made on the operation surface of the touch pad is greater than or equal to 2 based on signals from the electrostatic sensors; and
a sensitivity adjustment execution part that executes a sensitivity adjustment concerning the touch against the operation surface of the touch pad, wherein
when a state where the number-of-touched-point determination part is determining that the number of touched points is greater than or equal to 2 continues for a time greater than or equal to a first predetermined time, and, within a second predetermined time longer than the first predetermined time, the number-of-touched-point determination part determines that no touch is made on the operation surface, the sensitivity adjustment execution part executes the sensitivity adjustment in a current execution of a control routine, and when the state where the number-of-touched-point determination part is determining that the number of touched points is greater than or equal to 2 continues for a time greater than or equal to the first predetermined time, but the number-of-touched-point determination part does not determine that no touch is made on the operation surface within the second predetermined time, the sensitivity adjustment execution part ends the current execution of the control routine without executing the sensitivity adjustment.

2. The touch operation detection apparatus as claimed in claim 1, wherein the sensitivity adjustment execution part executes the sensitivity adjustment based on the maximum value of the electrostatic capacitances detected by the electrostatic sensors when the number of touched points is greater than or equal to 2.

3. The touch operation detection apparatus as claimed in claim 2, wherein the sensitivity adjustment execution part executes the sensitivity adjustment of changing an electrostatic capacitance threshold to be used to determine whether the touch is being made on the operation surface of the touch pad.

4. The touch operation detection apparatus as claimed in claim 3, wherein the touch operation detection apparatus determines that a human being is touching the touch pad, when the maximum value of the electrostatic capacitances detected by using the electrostatic sensors exceeds the electrostatic capacitance threshold, and the minimum value of the electrostatic capacitances detected by using the electrostatic sensors exceeds zero and is less than the electrostatic capacitance threshold.

5. The touch operation detection apparatus as claimed in claim 4, wherein the sensitivity adjustment execution part does not execute the sensitivity adjustment when a difference between the maximum value of the electrostatic capacitances detected by using the electrostatic sensors when the number-of-touched-point determination part determines that the number of touched points is greater than or equal to 2 and the maximum value of the electrostatic capacitances detected by using the electrostatic sensors when no touch is made on the operation surface of the touch pad is less than a predetermined value.

6. The touch operation detection apparatus as claimed in claim 3, wherein the sensitivity adjustment execution part does not execute the sensitivity adjustment when a difference between the maximum value of the electrostatic capacitances detected by using the electrostatic sensors when the number-of-touched-point determination part determines that the number of touched points is greater than or equal to 2 and the maximum value of the electrostatic capacitances detected by using the electrostatic sensors when no touch is made on the operation surface of the touch pad is less than a predetermined value.

7. The touch operation detection apparatus as claimed in claim 3, wherein when the state where the number-of-touched-point determination part is determining that the number of touched points is greater than or equal to 2 continues for a time greater than or equal to the first predetermined time under the condition where touched positions on the operation surface do not change, and, within the second predetermined time, the number-of-touched-point determination part determines that no touch is made on the operation surface, the sensitivity adjustment execution part executes the sensitivity adjustment in the current execution of the control routine.

8. The touch operation detection apparatus as claimed in claim 2, wherein the sensitivity adjustment execution part does not execute the sensitivity adjustment when a difference between the maximum value of the electrostatic capacitances detected by using the electrostatic sensors when the number-of-touched-point determination part determines that the number of touched points is greater than or equal to 2 and the maximum value of the electrostatic capacitances detected by using the electrostatic sensors when no touch is made on the operation surface of the touch pad is less than a predetermined value.

9. The touch operation detection apparatus as claimed in claim 2, wherein when the state where the number-of-touched-point determination part is determining that the number of touched points is greater than or equal to 2 continues for a time greater than or equal to the first predetermined time under the condition where touched positions on the operation surface do not change, and, within the second predetermined time, the number-of-touched-point determination part determines that no touch is made on the operation surface, the sensitivity adjustment execution part executes the sensitivity adjustment in the current execution of the control routine.

10. The touch operation detection apparatus as claimed in claim 1, wherein the sensitivity adjustment execution part executes the sensitivity adjustment of changing an electrostatic capacitance threshold to be used to determine whether the touch is being made on the operation surface of the touch pad.

11. The touch operation detection apparatus as claimed in claim 3, wherein the touch operation detection apparatus determines that a human being is touching the touch pad, when the maximum value of the electrostatic capacitances detected by using the electrostatic sensors exceeds the electrostatic capacitance threshold, and the minimum value of the electrostatic capacitances detected by using the electrostatic sensors exceeds zero and is less than the electrostatic capacitance threshold.

12. The touch operation detection apparatus as claimed in claim 5, wherein the sensitivity adjustment execution part does not execute the sensitivity adjustment when a difference between the maximum value of the electrostatic capacitances detected by using the electrostatic sensors when the number-of-touched-point determination part determines that the number of touched points is greater than or equal to 2 and the maximum value of the electrostatic capacitances detected by using the electrostatic sensors when no touch is made on the operation surface of the touch pad is less than a predetermined value.

13. The touch operation detection apparatus as claimed in claim 3, wherein the sensitivity adjustment execution part does not execute the sensitivity adjustment when a difference between the maximum value of the electrostatic capacitances detected by using the electrostatic sensors when the number-of-touched-point determination part determines that the number of touched points is greater than or equal to 2 and the maximum value of the electrostatic capacitances detected by using the electrostatic sensors when no touch is made on the operation surface of the touch pad is less than a predetermined value.

14. The touch operation detection apparatus as claimed in claim 10, wherein when the state where the number-of-touched-point determination part is determining that the number of touched points is greater than or equal to 2 continues for a time greater than or equal to the first predetermined time under the condition where touched positions on the operation surface do not change, and, within the second predetermined time, the number-of-touched-point determination part determines that no touch is made on the operation surface, the sensitivity adjustment execution part executes the sensitivity adjustment in the current execution of the control routine.

15. The touch operation detection apparatus as claimed in claim 1, wherein the sensitivity adjustment execution part does not execute the sensitivity adjustment when a difference between the maximum value of the electrostatic capacitances detected by using the electrostatic sensors when the number-of-touched-point determination part determines that the number of touched points is greater than or equal to 2 and the maximum value of the electrostatic capacitances detected by using the electrostatic sensors when no touch is made on the operation surface of the touch pad is less than a predetermined value.

16. The touch operation detection apparatus as claimed in claim 1, wherein when the state where the number-of-touched-point determination part is determining that the number of touched points is greater than or equal to 2 continues for a time greater than or equal to the first predetermined time under the condition where touched positions on the operation surface do not change, and, within the second predetermined time, the number-of-touched-point determination part determines that no touch is made on the operation surface, the sensitivity adjustment execution part executes the sensitivity adjustment in the current execution of the control routine.

* * * * *